United States Patent
Iwase

(10) Patent No.: US 11,773,541 B2
(45) Date of Patent: Oct. 3, 2023

(54) CONVEYING PATH SWITCHING DEVICE AND ELEVATOR APPARATUS

(71) Applicant: Mitsubishi Electric Corporation, Tokyo (JP)

(72) Inventor: Masaoki Iwase, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 921 days.

(21) Appl. No.: 16/623,396

(22) PCT Filed: Jul. 20, 2018

(86) PCT No.: PCT/JP2018/027236
§ 371 (c)(1),
(2) Date: Dec. 17, 2019

(87) PCT Pub. No.: WO2019/021950
PCT Pub. Date: Jan. 31, 2019

(65) Prior Publication Data
US 2020/0173115 A1    Jun. 4, 2020

(30) Foreign Application Priority Data
Jul. 26, 2017   (JP) ................. 2017-144420

(51) Int. Cl.
*E01B 25/34* (2006.01)
*B60L 13/03* (2006.01)
(Continued)

(52) U.S. Cl.
CPC .............. *E01B 25/34* (2013.01); *B60L 13/03* (2013.01); *B61B 13/04* (2013.01); *B66B 7/022* (2013.01); *B66B 11/0407* (2013.01)

(58) Field of Classification Search
CPC .......... E01B 25/32; E01B 25/34; B60L 13/04; B60L 13/00; B60L 13/03; B61B 13/08;
(Continued)

(56) References Cited

U.S. PATENT DOCUMENTS 3,760,739 A  *  9/1973  Benner ................. B61L 23/005
                                                      310/12.32
3,905,303 A       9/1975  Dull
(Continued)

FOREIGN PATENT DOCUMENTS

CN          105755914 A  *  7/2016
DE            4142914 A1  *  7/1993 ............. E01B 25/00
(Continued)

OTHER PUBLICATIONS

International Search Report and Written Opinion dated Oct. 16, 2018 for PCT/JP2018/027236 filed on Jul. 20, 2018, 8 pages including English Translation of the International Search Report.
(Continued)

*Primary Examiner* — Minh Truong
*Assistant Examiner* — Michelle M Lantrip
(74) *Attorney, Agent, or Firm* — XSENSUS LLP

(57) ABSTRACT

A conveying-path rotary switching unit that is a conveying path switching device includes a base, stators arranged along conveying paths for branching for a conveying carriage, a first conveying path provided on the base, and a second conveying path that is provided on the base and is different from the first conveying path. As for a conveying path on which the conveying carriage travels, the first conveying path and the second conveying path are switchable by rotation. The stators are used for both the first conveying path and the second conveying path in a shared manner.

20 Claims, 6 Drawing Sheets

(51) Int. Cl.
  *B61B 13/04* (2006.01)
  *B66B 7/02* (2006.01)
  *B66B 11/04* (2006.01)

(58) Field of Classification Search
  CPC ..... B61B 13/04; B66B 11/0407; B66B 7/022; B66B 9/003; B66B 7/026
  See application file for complete search history.

(56) References Cited

U.S. PATENT DOCUMENTS

| | | | | |
|---|---|---|---|---|
| 4,919,054 | A * | 4/1990 | Matsuo | B61B 13/08 |
| | | | | 104/94 |
| 5,094,172 | A * | 3/1992 | Kummer | E01B 25/34 |
| | | | | 104/282 |
| 5,499,583 | A * | 3/1996 | Blumel | E01B 25/34 |
| | | | | 104/130.05 |
| 6,371,418 | B1 * | 4/2002 | Oswald | E01B 7/00 |
| | | | | 246/415 R |
| 6,450,103 | B2 | 9/2002 | Svensson | |
| 6,784,572 | B1 | 8/2004 | Backman et al. | |
| 7,781,993 | B1 * | 8/2010 | Faizullabhoy | H02P 25/06 |
| | | | | 318/135 |
| 2003/0154878 | A1 * | 8/2003 | Fichtner | E01B 25/34 |
| | | | | 104/130.11 |
| 2007/0186799 | A1 | 8/2007 | Kyutoku et al. | |
| 2009/0095846 | A1 * | 4/2009 | Roop | E01B 25/34 |
| | | | | 246/415 R |
| 2011/0062901 | A1 * | 3/2011 | Busch | H02K 11/215 |
| | | | | 318/135 |
| 2013/0074724 | A1 * | 3/2013 | King | B60L 15/005 |
| | | | | 104/130.02 |
| 2014/0090575 | A1 | 4/2014 | Nagamine et al. | |
| 2014/0368062 | A1 | 12/2014 | Loeser et al. | |
| 2018/0334362 | A1 * | 11/2018 | Raassina | B66B 11/0226 |
| 2019/0077277 | A1 * | 3/2019 | Holzleitner | B60L 13/03 |
| 2019/0177125 | A1 * | 6/2019 | Gainche | B66B 7/026 |
| 2020/0095072 | A1 * | 3/2020 | Davidson | B60L 13/03 |

FOREIGN PATENT DOCUMENTS

| | | |
|---|---|---|
| DE | 602 20 990 T2 | 3/2008 |
| DE | 10 2011 056 249 A1 | 6/2013 |
| JP | 50-111707 A | 9/1975 |
| JP | 64-024668 U | 2/1989 |
| JP | 01-291605 A | 11/1989 |
| KR | 10-1999-0075002 A | 10/1999 |
| KR | 10-2007-0082052 A | 8/2007 |
| KR | 10-2013-0133071 A | 12/2013 |

OTHER PUBLICATIONS

Office Action dated May 12, 2021, in corresponding Korean patent Application No. 10-2019-7037793, 6 pages.
Office Action dated Jan. 24, 2022 in German Patent Application No. 11 2018 003 804.1, 12 pages.

* cited by examiner

CONVEYING PATH SWITCHING DEVICE AND ELEVATOR APPARATUS

CROSS-REFERENCE TO RELATED APPLICATIONS

The present application is based on PCT filing PCT/JP2018/027236, filed Jul. 20, 2018, which claims priority to JP 2017-144420, filed Jul. 26, 2017, the entire contents of each are incorporated herein by reference.

FIELD

The present invention relates to a conveying path switching device provided in a conveying apparatus, and an elevator apparatus using the conveying path switching device.

BACKGROUND

Conventionally, there is known a conveying apparatus including a base and a conveying carriage moving on the base, which includes a linear motor configured by a stator provided in the base and a mover provided in the conveying carriage and controls power supply to the stator or the mover to generate thrust, thereby driving the conveying carriage. Tracks for this conveying carriage include a straight track, a curved track, and a branch track. A plurality of adjacent tracks are provided in the traveling direction of the conveying carriage on the branch track. This branch track is switched to be connected to any one of the plural tracks before approach of the conveying carriage.

Patent Literature 1 discloses a point machine for a magnetic levitation track. The point machine includes a plurality of supports including a stator called a reaction rail and a motor that causes each support to rotate about a rotation axis extending in parallel to or perpendicularly to the traveling direction, and causes the supports to rotate.

CITATION LIST

Patent Literature

Patent Literature 1: Japanese Patent Application Laid-open No. S50-111707

SUMMARY

Technical Problem

However, according to the conventional technique described above, the stators are correspondingly required for each of a plurality of branch tracks. Therefore, there is a problem that it is necessary to provide the stators the number of which corresponds to the number of branches.

The present invention has been achieved in view of the above problem, and an object of the present invention is to provide a conveying path switching device capable of reducing the number of provided stators.

Solution to Problem

An aspect of the present invention provides a conveying path switching device provided in a conveying apparatus that drives a conveying carriage by stators and by a mover in the conveying carriage. The conveying path switching device includes: a base; the stators arranged along conveying paths for branching for the conveying carriage; a first conveying path provided on the base; and a second conveying path that is provided on the base and is different from the first conveying path. As for a conveying path on which the conveying carriage travels, the first conveying path and the second conveying path are switchable by rotation. The stators are used for both the first conveying path and the second conveying path in a shared manner.

Advantageous Effects of Invention

According to the present invention, an effect is obtained wherein the number of provided stators can be reduced.

DESCRIPTION OF EMBODIMENTS

A conveying path switching device and an elevator apparatus according to embodiments of the present invention will be described in detail below with reference to the accompanying drawings. The present invention is not limited to the following embodiments.

First Embodiment

Figure 1:
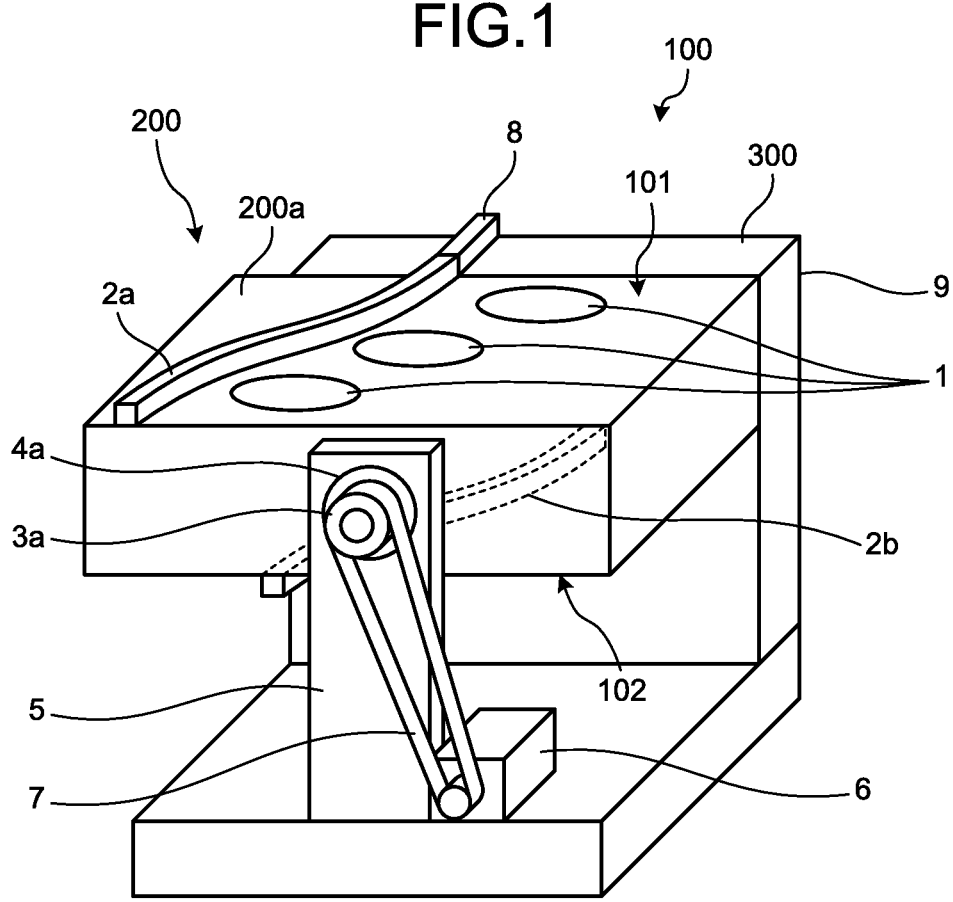
FIG. 1 is a diagram illustrating a configuration of a conveying apparatus including a conveying-path rotary switching unit that is a conveying path switching device according to a first embodiment.

FIG. 1 is a diagram illustrating a configuration of a conveying apparatus 100 including a conveying-path rotary switching unit 200 that is a conveying path switching device according to a first embodiment. The conveying apparatus 100 illustrated in FIG. 1 is generally divided into the conveying-path rotary switching unit 200 and a driving unit 300.

Figure 2:
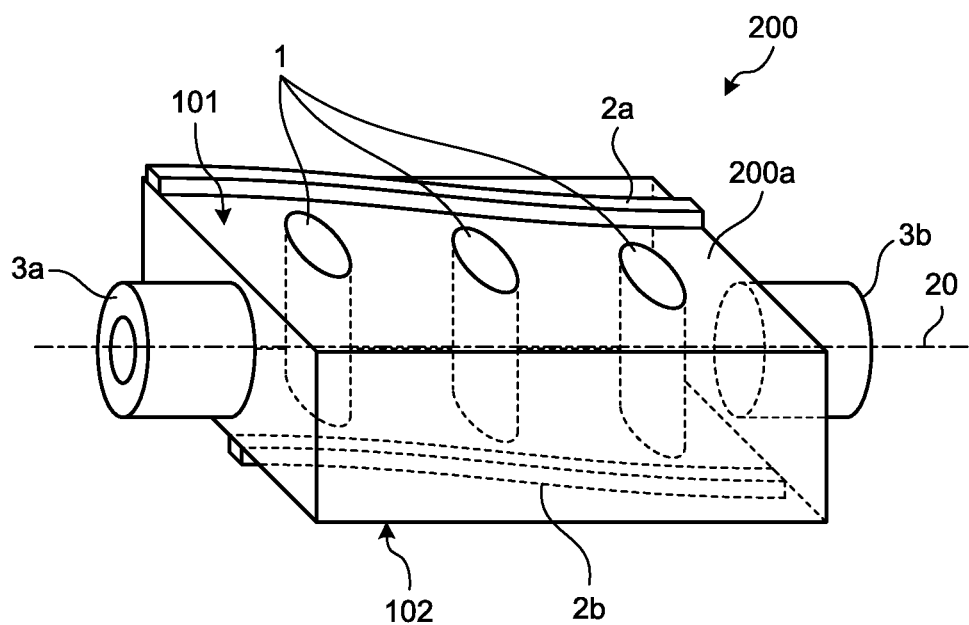
FIG. 2 is a diagram illustrating a configuration of the conveying-path rotary switching unit in the first embodiment.

FIG. 2 is a diagram illustrating a configuration of the conveying-path rotary switching unit 200 in the first embodiment. The conveying-path rotary switching unit 200 in the form of a cuboid illustrated in FIG. 2 includes a base 200a, a plurality of stators 1, rails 2a and 2b, and shafts 3a and 3b. The rail 2a is provided on the base 200a. The rail 2a is provided on the base 200a to configure a first conveying path 101 provided on a first track. The rail 2b is provided on a different surface of the base 200a from the first conveying path 101. The rail 2b is provided on the base 200a to configure a second conveying path 102 provided on a second track. The rails 2a and 2b each serve as a conveying path for branching when being connected to a rail of a post-branching conveying path and a rail of a pre-branching conveying path which are to be described later. The shafts 3a and 3b are driven to rotate about a rotation axis 20, when the first track and the second track are switched to each other in the conveying-path rotary switching unit 200. The shape of each of the shafts 3a and 3b is cylindrical.

Each of the stators 1 is a permanent magnet or an electromagnet. The stators 1 are arranged along the rails 2a and 2b serving as the conveying paths for branching. The stators 1 can configure a linear motor together with a mover provided in a conveying carriage (not illustrated in FIG. 1) that travels on the conveying apparatus 100. All the stators 1 penetrate through the conveying-path rotary switching unit 200 and serve as stators on both surfaces of the conveying-path rotary switching unit 200.

The rail 2a supports the conveying carriage traveling on the conveying apparatus 100, on the first conveying path 101 on the conveying-path rotary switching unit 200 in such a manner that the conveying carriage is movable in the conveying direction. The rail 2b supports the conveying carriage traveling on the conveying apparatus 100, on the second conveying path 102 on the conveying-path rotary switching unit 200 in such a manner that the conveying carriage is movable in the conveying direction.

Figure 3:
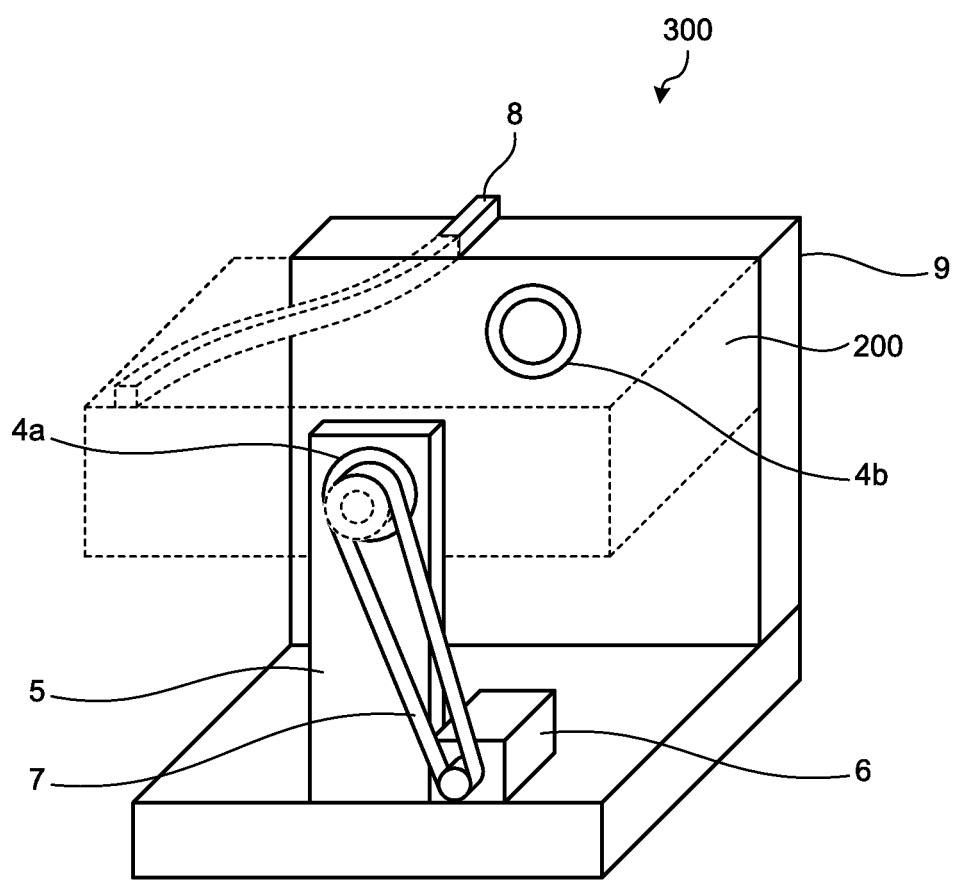
FIG. 3 is a diagram illustrating a configuration of a driving unit in the first embodiment.

The shaft 3a is supported to be rotatable by a bearing 4a of the driving unit 300 described later on one side surface of the conveying-path rotary switching unit 200. The shaft 3b is provided on a back surface of the conveying-path rotary switching unit 200 when the side surface on which the shaft 3a is provided is assumed as a front surface, and is supported to be rotatable by a bearing 4b of the driving unit 300 described later. FIG. 3 is a diagram illustrating a configuration of the driving unit 300 in the first embodiment. The driving unit 300 illustrated in FIG. 3 includes the bearings 4a and 4b, a support member 5, a motor 6, a belt 7, a connecting rail 8, and a support member 9. The bearing 4a supports the shaft 3a of the conveying-path rotary switching unit 200 in a rotatable manner. The bearing 4b supports the shaft 3b of the conveying-path rotary switching unit 200 in a rotatable manner. The support member 5 supports the bearing 4a. The motor 6 drives the shaft 3a to rotate when the conveying-path rotary switching unit 200 is switched. The belt 7 connects the shaft 3a and the motor 6 to each other. The connecting rail 8 is connected to a pre-branching conveying path (not illustrated in FIG. 3) on the opposite side to the conveying-path rotary switching unit 200. The support member 9 has a track surface on which the connecting rail 8 is provided, and supports the bearing 4b.

Figure 4:
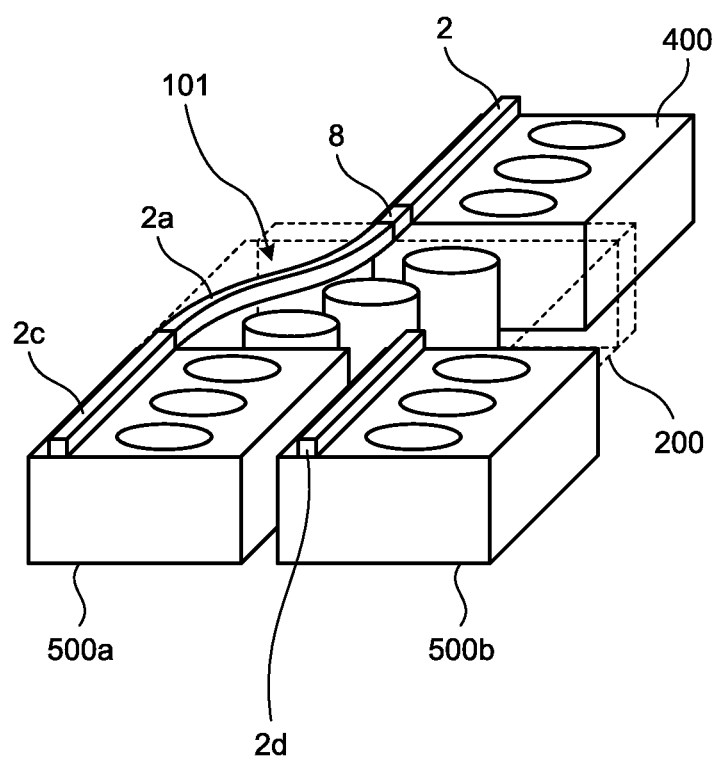
FIG. 4 is a diagram illustrating a track in a case where a first conveying path is a track surface of the conveying-path rotary switching unit in the first embodiment.
Figure 5:
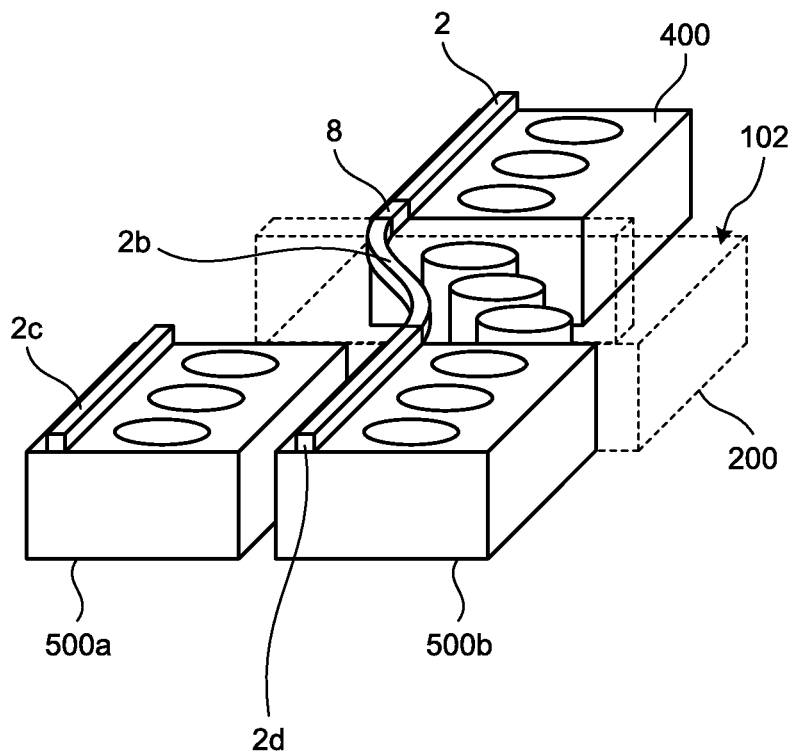
FIG. 5 is a diagram illustrating a track in a case where a second conveying path is the track surface of the conveying-path rotary switching unit in the first embodiment.

FIG. 4 is a diagram illustrating a track in a case where the first conveying path 101 is a track surface of the conveying-path rotary switching unit 200 in the first embodiment. FIG. 5 is a diagram illustrating a track in a case where the second conveying path 102 is the track surface of the conveying-path rotary switching unit 200 in the first embodiment. As illustrated in FIGS. 4 and 5, the conveying-path rotary switching unit 200 is provided between a pre-branching conveying path 400, and a first post-branching conveying path 500a and a second post-branching conveying path 500b.

A rail 2 is provided on a track surface of the pre-branching conveying path 400. A rail 2c is provided on a track surface of the first post-branching conveying path 500a. A rail 2d is provided on a track surface of the second post-branching conveying path 500b.

As illustrated in FIG. 4, when the first conveying path 101 becomes a track surface for a conveying carriage (not illustrated in FIG. 4), that is, a conveying path on which the conveying carriage is to travel, one end of the rail 2a is connected to the connecting rail 8 and the other end of the rail 2a is connected to the rail 2c. Subsequently, the rail 2 of the pre-branching conveying path 400 is connected to the connecting rail 8, the connecting rail 8 is connected to the rail 2a, and the rail 2a is connected to the rail 2c. Therefore, a shape is achieved in which the rail 2, the connecting rail 8, the rail 2a, and the rail 2c are mutually connected in a line.

As illustrated in FIG. 5, when the second conveying path 102 becomes a track surface for a conveying carriage (not illustrated in FIG. 5), that is, a conveying path on which the conveying carriage is to travel, one end of the rail 2b is connected to the connecting rail 8 and the other end of the rail 2b is connected to the rail 2d. Subsequently, the rail 2 of the pre-branching conveying path 400 is connected to the connecting rail 8, the connecting rail 8 is connected to the rail 2b, and the rail 2b is connected to the rail 2d. Therefore, a shape is achieved in which the rail 2, the connecting rail 8, the rail 2b, and the rail 2d are mutually connected in a line.

In a case where one end of the rail 2a is connected to the connecting rail 8 and the other end of the rail 2a is connected to the rail 2c as illustrated in FIG. 4, the conveying carriage that has entered from the pre-branching conveying path 400 to the conveying-path rotary switching unit 200 is driven by the stators 1 while being supported by the rail 2a in the conveying-path rotary switching unit 200. A track shape formed by centers of end surfaces of the stators 1 on the side of the rail 2a is designed to be coincident with the rail 2a so that the conveying carriage on the rail 2a can be driven.

In a case where one end of the rail 2b is connected to the connecting rail 8 and the other end of the rail 2b is connected to the rail 2d as illustrated in FIG. 5, the conveying carriage that has entered from the pre-branching conveying path 400 to the conveying-path rotary switching unit 200 is driven by the stators 1 while being supported by the rail 2b in the conveying-path rotary switching unit 200 as in the case in FIG. 4. A track shape formed by centers of end surfaces of the stators 1 on the side of the rail 2b is designed to be coincident with the rail 2b so that the conveying carriage on the rail 2b can be driven.

In the conventional technique, it is necessary to provide stators the number of which corresponds to the number of conveying paths for branching. Meanwhile, according to the first embodiment, the conveying carriage is driven, on both the rail 2a and the rail 2b, by the same stators 1 that penetrate through the conveying-path rotary switching unit 200 as illustrated in FIGS. 4 and 5. Therefore, the same stators 1 can be used both before and after switching of the conveying-path rotary switching unit 200. Consequently, the number of components, more specifically, the number of provided stators can be reduced as compared with that in the conventional technique.

Although a cuboid has been exemplified as the shape of the conveying-path rotary switching unit 200 in the first embodiment, the present invention is not limited thereto. The shape of the conveying-path rotary switching unit 200 is not limited to a cuboid, as long as the stators 1 can be used in a shared manner for both the first conveying path 101 and the second conveying path 102 that can be switched by rotation.

Further, although a mode in which the first conveying path 101 and the second conveying path 102 through which the stators 1 penetrate are opposite surfaces to each other has been exemplified in the first embodiment, the present invention is not limited thereto. It is not always necessary that the first conveying path 101 and the second conveying path 102 are provided on the opposite surfaces to each other, as long as both the first conveying path 101 and the second conveying path 102 that can be switched by rotation can share the stators 1 penetrating the first conveying path 101 and the second conveying path 102. In a case where two surfaces are opposite surfaces, when one of the surfaces is assumed as a front surface, the other is a back surface and an angle formed by normal vectors of these surfaces is 180 degrees.

Furthermore, although the stators 1 penetrate two track surfaces in the first embodiment, the present invention is not limited thereto. The conveying-path rotary switching unit 200 may include a further track surface other than the first conveying path 101 and the second conveying path 102, as long as all the track surfaces that can be switched by rotation can share the stators 1 penetrating these track surfaces.

Further, although the rotation axis 20 of the conveying-path rotary switching unit 200 is parallel to the traveling direction in the first embodiment, the present invention is not limited thereto. It suffices that track surfaces for a conveying carriage are switched by rotation and all the track surfaces that can be mutually switched share the stators 1 penetrating the track surfaces, and it is not always necessary that the rotation direction is parallel to the traveling direction.

In a case where the stators 1 are electromagnets in the first embodiment, it is necessary to lead a power cable. Further, because it is necessary to provide a position detector for a conveying carriage in the conveying-path rotary switching unit 200, an output cable of the position detector needs to be led. In a case where it is necessary to lead the cable that connects the conveying-path rotary switching unit 200 and outside to each other as described above, it suffices that a portion from the shaft 3a to the shaft 3b, which are to rotate, is formed to be hollow and the cable is led through the hollow shafts 3a and 3b to outside of the conveying-path rotary switching unit 200. That is, it suffices that a wiring hole is provided along the rotation axis 20. According to this configuration, it is possible to suppress a relative behavior of the cable with respect to the conveying-path rotary switching unit 200, caused by rotation of the conveying-path rotary switching unit 200, and to suppress disconnection of the cable. It suffices that the cabling hole is provided along the rotation axis 20 of the conveying-path rotary switching unit 200, and the hole may be another means. For example, a solid shaft may be provided at the position of the shaft 3a or the shaft 3b to cantilever-support the conveying-path rotary switching unit 200, and the wiring hole may be provided along the rotation axis 20 of the conveying-path rotary switching unit 200 in a different surface from a surface on which the solid shaft is provided.

As described above, according to the first embodiment, the stators 1 penetrate a plurality of track surfaces of the conveying-path rotary switching unit 200 and the stators 1 can be shared by the track surfaces. Therefore, the number of the provided stators 1 can be reduced.

Second Embodiment

In a second embodiment, a mode is described in which tracks of conveying paths for branching, formed by center points of end surfaces of stators on the conveying-paths, are symmetric with respect to a plane that passes through a rotation axis of a conveying-path rotary switching unit.

Figure 6:
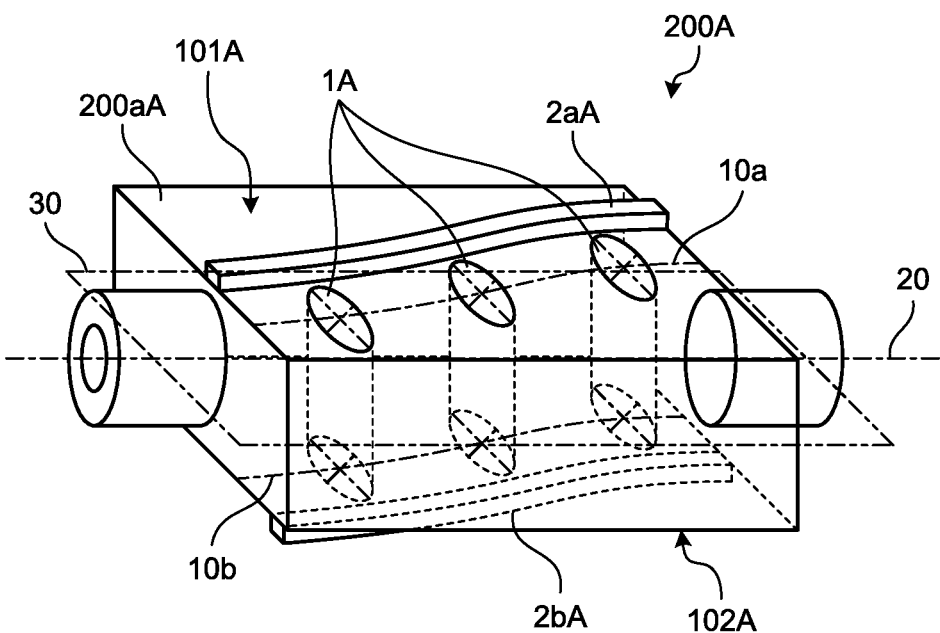
FIG. 6 is a diagram illustrating a configuration of a conveying-path rotary switching unit that is a conveying path switching device according to a second embodiment.

FIG. 6 is a diagram illustrating a configuration of a conveying-path rotary switching unit 200A that is a conveying path switching device according to the second embodiment. FIG. 6 illustrates the rotation axis 20 of the conveying-path rotary switching unit 200A and a virtual plane 30 that contains the rotation axis 20 and is parallel to conveying surfaces formed on both surfaces of the conveying-path rotary switching unit 200A. In the conveying-path rotary switching unit 200A illustrated in FIG. 6, a track 10a of a conveying path for branching and a track 10b provided on a back surface when the surface of the track 10a is assumed as a front surface, which are formed by center points of end surfaces of stators 1A that penetrate through a base 200aA, are symmetric with respect to the virtual plane 30. A rail 2aA is provided on a first conveying path 101A of the base 200aA in place of the rail 2a of the conveying-path rotary switching unit 200, and a rail 2bA is provided on a second conveying path 102A of the base 200aA in place of the rail 2b of the conveying-path rotary switching unit 200. The second conveying path 102A is provided on the back surface when the surface on which the first conveying path 101A is provided is assumed as a front surface, but is not limited thereto. In a case where, assuming that one of surfaces is a front surface, the other is a back surface, an angle formed by normal vectors of these surfaces is 180 degrees.

Because the track 10a and the track 10b are symmetric with respect the virtual plane 30 that passes through the rotation axis 20, the stators 1A penetrate through the base 200aA in the shortest route. Further, it is preferable that a stator is formed in the form of a cylinder having a bottom surface that is in contact with a conveying surface, in general. However, it is possible to form each stator 1A in the form of not only a cylinder but also a frustum with respect to the conveying surface. In a case where the stators 1A are formed in the form of cylinders or frustums, the stators 1A can have the same shape as each other and it is therefore possible to manufacture the stators 1A with less workload. Further, when the stators 1A are formed in the form of cylinders or frustums in a case where the stators 1A are coils, it is easy to wind the coils parallel to the conveying surface, and winding design and winding work are easy.

According to the second embodiment, it is possible to reduce a process of manufacturing stators.

Third Embodiment

In a third embodiment, a mode achieving such a shape that a curvature of a track is continuous is described. In the third embodiment, constituent elements identical to those illustrated in the first and second embodiments are denoted by like reference signs and explanations thereof are omitted. Explanations of the first and second embodiments are incorporated herein.

Figure 7:
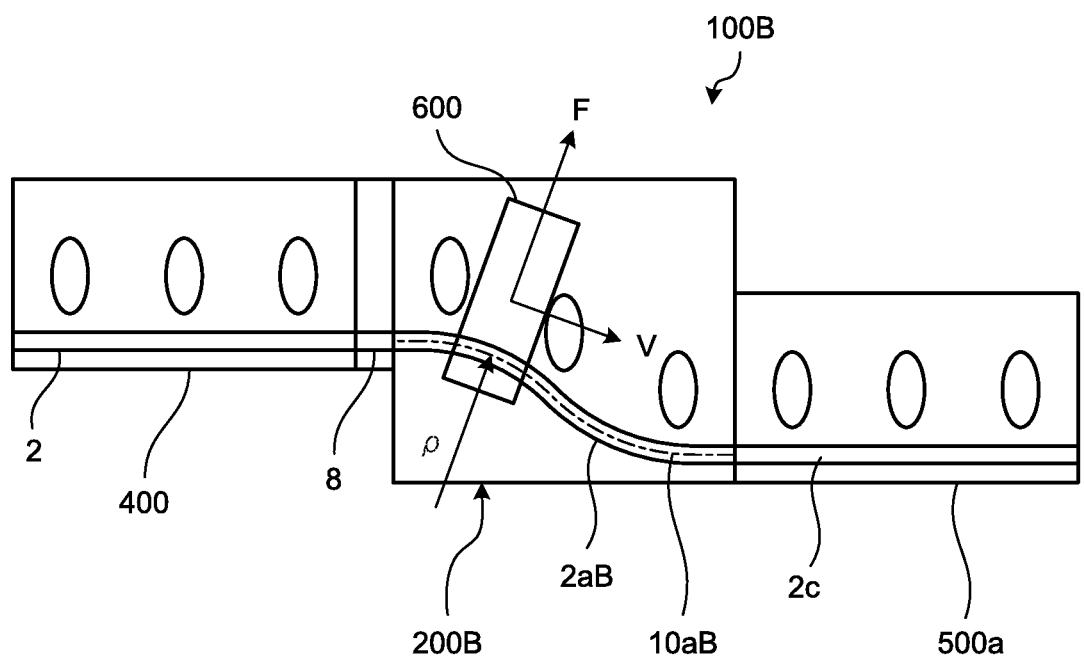
FIG. 7 is a top view illustrating a configuration of a conveying apparatus including a conveying-path rotary switching unit that is a conveying path switching device according to a third embodiment.

FIG. 7 is a top view illustrating a configuration of a conveying apparatus 100B including a conveying-path rotary switching unit 200B that is a conveying path switching device according to the third embodiment. The conveying-path rotary switching unit 200B, the pre-branching conveying path 400 adjacent to the conveying-path rotary switching unit 200B, the first post-branching conveying path 500a adjacent to the conveying-path rotary switching unit 200B on the opposite side to the pre-branching conveying path 400, and a conveying carriage 600 are illustrated in the conveying apparatus 100B illustrated in FIG. 7. Illustrations of the second post-branching conveying path 500b are omitted here. The conveying-path rotary switching unit 200B is provided to be in contact with both the pre-branching conveying path 400 and the first post-branching conveying path 500a.

The conveying carriage 600 travels from the rail 2 to the rail 2c via the connecting rail 8 and a rail 2aB. The shape of a track 10aB for the conveying carriage 600 is such a shape that a curvature is continuous from the rail 2 to the rail 2c via the connecting rail 8 and the rail 2aB.

A centrifugal force F acting on the rail 2aB is calculated here. Using a curvature ρ of the rail 2aB, a velocity V of the conveying carriage 600, and a mass M of the conveying carriage 600, $F=M \times \rho \times V^2$ is established. From this expression, the centrifugal force F is linear with respect to the curvature p. Therefore, the centrifugal force F is discontinuous if the curvature ρ is discontinuous, which causes generation of an impact on the conveying carriage 600. As a result, there is a risk that the conveying carriage 600 or a conveyed object on the conveying carriage 600 is damaged.

Therefore, the track 10aB is formed to have such a shape that the curvature is continuous from the rail 2 to the rail 2c via the connecting rail 8 and the rail 2aB as illustrated in FIG. 7. With this configuration, it is possible to reduce generation of an impact on the conveying carriage 600.

According to the third embodiment, it is possible to reduce an impact on the conveying carriage 600 and to reduce damage of the conveying carriage 600 and a conveyed object on the conveying carriage 600.

The third embodiment can be combined with the first and second embodiments.

Fourth Embodiment

In a fourth embodiment, a mode is described in which any of the conveying path switching devices described in the first to third embodiments is applied as a hoistway switching device of an elevator apparatus.

As is well known, a conventional elevator apparatus is configured in such a manner that a car and a counterweight are provided in a hoistway, are coupled to each other with a main rope, and are driven to be raised and lowered by a hoisting motor installed in a machine room.

Meanwhile, a rope-less elevator apparatus is known which drives a car by thrust generated between a primary coil of a linear motor provided in a hoistway and a permanent magnet that is provided in the car and configures a secondary side of the linear motor.

Further, an elevator apparatus capable of moving both vertically and horizontally is also known which can move not only in a single hoistway but also to a different hoistway. In this elevator apparatus capable of moving both vertically and horizontally, a car is moved horizontally to switch hoistways.

Figure 8:
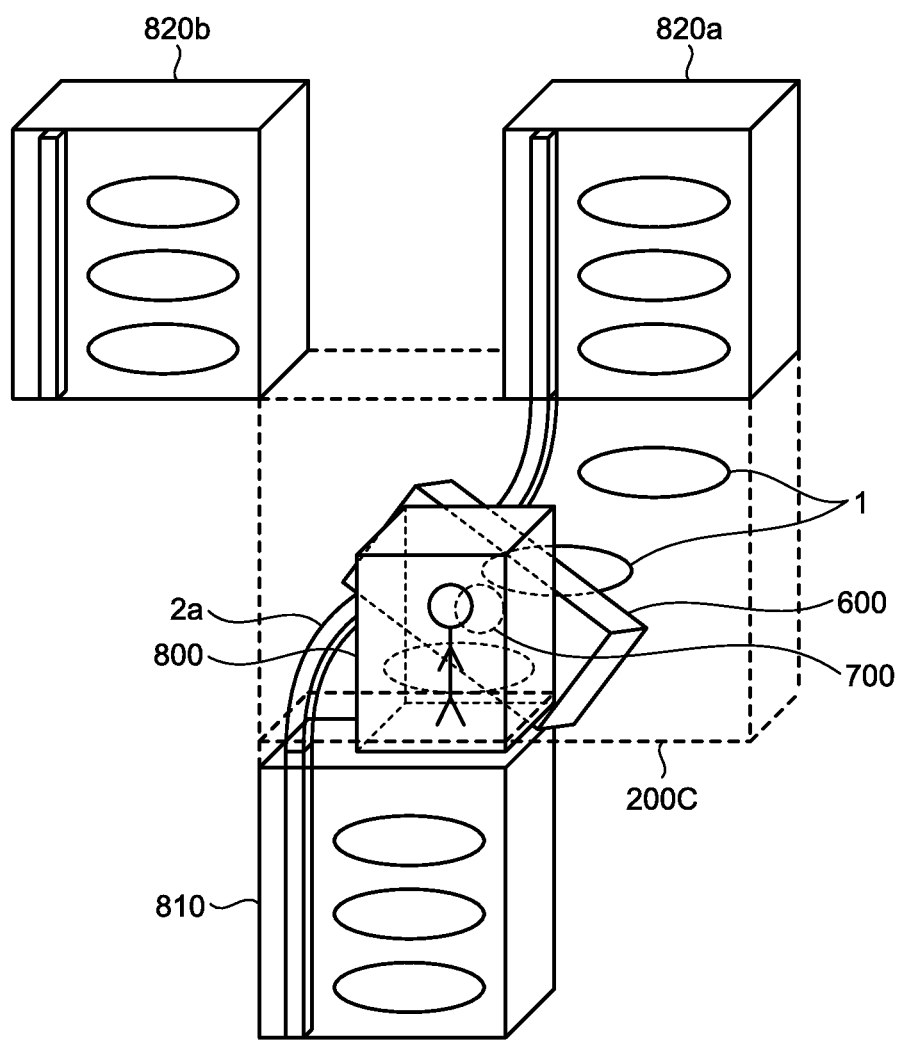
FIG. 8 is a diagram illustrating a configuration of an elevator apparatus according to a fourth embodiment.

FIG. 8 is a diagram illustrating a configuration of an elevator apparatus according to the fourth embodiment. The elevator apparatus according to the fourth embodiment is an elevator apparatus that drives a car by thrust generated between a primary coil of a linear motor provided in a hoistway and a permanent magnet that is provided in the car and configures a secondary side of the linear motor, and that uses any of the conveying path switching devices described in the first to third embodiments for switching conveying paths. In FIG. 8, a car 800 is provided on the conveying carriage 600 via a rotary joint 700 in the elevator apparatus according to the fourth embodiment.

In the state illustrated in FIG. 8, the conveying carriage 600 that has entered a hoistway switching device 200C from a pre-branching hoistway 810 is driven by the stators 1 while being supported by the rail 2a in the hoistway switching device 200C. A shape of a track formed by centers of end surfaces of the stators 1 on the side of the rail 2a is designed to be coincident with the rail 2a so that the conveying carriage 600 on the rail 2a can be driven. As a result of this configuration, it is possible to cause the conveying carriage 600 to enter a first post-branching hoistway 820a.

Further, although not illustrated, it is possible to cause the conveying carriage 600 to enter a second post-branching hoistway 820b by switching a conveying path in a rotating manner as in FIG. 5 of the first embodiment.

Next, advantageous effects of the fourth embodiment are described. In the above-described conventional elevator capable of moving both vertically and horizontally, it is necessary to stop a car once in order to move it to a different hoistway. On the other hand, in a case of the hoistway switching device 200C according to the fourth embodiment, it is unnecessary to stop the car when the car moves to the different hoistway. Further, it is possible to reduce the number of components, more specifically, the number of provided stators, as compared with a case where the technique of Patent Literature 1 described as a prior art document of the present application is applied to the conventional elevator capable of moving both vertically and horizontally as it is.

While the conveying carriage 600 travels on the first conveying path 101 and the second conveying path 102 that are hoistways for branching, it is necessary that the posture of a car, on which a passenger or a cargo is to be loaded, with respect to the ground is constant. Therefore, the car 800 is provided via the rotary joint 700 as illustrated in FIG. 8, so that the posture of the car 800 with respect to the ground is kept constant. In a case where the posture of the car 800 with respect to the ground is not stable because of friction with a contact portion of the rotary joint 700 or the like, it suffices to solve this problem by employing a configuration in which a rotary actuator and its control device are added or providing a mechanical locking mechanism to keep the posture of the car 800 with respect to the ground constant, for example.

The configurations described in the above embodiments are only examples of the content of the present invention. The configurations can be combined with other well-known techniques, and part of each of the configurations can be omitted or modified without departing from the scope of the present invention.

REFERENCE SIGNS LIST 1, 1A stator, 2, 2a, 2aA, 2aB, 2b, 2bA, 2c, 2d rail, 3a, 3b shaft, 4a, 4b bearing, 5 support member, 6 motor, 7 belt, 8 connecting rail, 9 support member, 10a, 10aB, 10b track, 20 rotation axis, 30 virtual plane, 100, 100B conveying apparatus, 101, 101A first conveying path, 102, 102A second conveying path, 200, 200A, 200B conveying-path rotary switching unit, 200C hoistway switching device, 200a, 200aA base, 300 driving unit, 400 pre-branching conveying path, 500a first post-branching conveying path, 500b second post-branching conveying path, 600 conveying carriage, 700 rotary joint, 800 car, 810 pre-branching hoistway, 820a first post-branching hoistway, 820b second post-branching hoistway.

The invention claimed is:

1. A conveying path switching device provided in a conveying apparatus that drives a conveying carriage, comprising:

a base;
stators along conveying paths for branching for the conveying carriage;
a first conveying path on the base; and
a second conveying path that is on the base and is different from the first conveying path, wherein
as for a conveying path on which the conveying carriage travels, the first conveying path and the second conveying path are switchable by rotation thereof,
the stators are shared for both the first conveying path and the second conveying path, and
the first conveying path is on a first side of the base and the second conveying path is on a second side of the base opposite the first side.

2. The conveying path switching device according to claim 1, wherein the stators penetrate through the base from the first conveying path to the second conveying path.

3. The conveying path switching device according to claim 2, wherein a curvature of each of the first conveying path and the second conveying path is shaped such that an adjacent pre-branching conveying path and an adjacent post-branching conveying path are connected contiguously via the first conveying path or the second conveying path.

4. The conveying path switching device according to claim 2, wherein respective distinct tracks of the conveying paths for branching that are imaginal lines connecting center points of both end surfaces of the stators on the conveying paths, are symmetric with respect to each other across a rotation axis of the rotation.

5. The conveying path switching device according to claim 4, wherein a curvature of each of the first conveying path and the second conveying path is shaped such that an adjacent pre-branching conveying path and an adjacent post-branching conveying path are connected contiguously via the first conveying path or the second conveying path.

6. The conveying path switching device according to claim 1, wherein a wiring hole is in a shaft for the rotation.

7. The conveying path switching device according to claim 1, wherein respective distinct tracks of the conveying paths for branching, that are imaginal lines connecting center points of both end surfaces of the stators on the conveying paths, are symmetric with respect to each other across a rotation axis of the rotation.

8. The conveying path switching device according to claim 7, wherein a curvature of each of the first conveying path and the second conveying path is shaped such that an adjacent pre-branching conveying path and an adjacent post-branching conveying path are connected contiguously via the first conveying path or the second conveying path.

9. The conveying path switching device according to claim 1, wherein a curvature of each of the first conveying path and the second conveying path is shaped such that an adjacent pre-branching conveying path and an adjacent post-branching conveying path are connected contiguously via the first conveying path or the second conveying path.

10. The conveying path switching device according to claim 1, wherein at least one of the stators extends through a rotation axis for rotation of the base.

11. The conveying path switching device according to claim 1, wherein the stators penetrate through the base from the first side of the base to the second side of the base.

12. An elevator apparatus that drives a car by thrust generated between a primary coil of a linear motor provided in a hoistway and a magnet that is provided in the car and configures a secondary side of the linear motor, comprising a conveying path switching device for switching conveying paths, the conveying path switching device including:
a base;
stators along the conveying paths for branching for a conveying carriage;
a first conveying path on the base; and
a second conveying path that is on the base and is different from the first conveying path, wherein
as for a conveying path on which the conveying carriage travels, the first conveying path and the second conveying path are switchable by rotation of the base,
the stators are shared for both the first conveying path and the second conveying path, and
the first conveying path is on a first side of the base and the second conveying path is on a second side of the base opposite the first side.

13. The elevator apparatus according to claim 12, wherein the stators penetrate through the base from the first conveying path to the second conveying path.

14. The elevator apparatus according to claim 12, wherein respective distinct tracks of the conveying paths for branching that are imaginal lines connecting center points of both end surfaces of the stators on the conveying paths, are symmetric with respect to each other across a rotation axis of the rotation.

15. The elevator apparatus according to claim 12, wherein a curvature of each of the first conveying path and the second conveying path is shaped such that an adjacent pre-branching conveying path and an adjacent post-branching conveying path are connected contiguously via the first conveying path or the second conveying path.

16. The elevator apparatus according to claim 12, wherein a wiring hole is in a shaft for the rotation.

17. The elevator apparatus according to claim 12, wherein at least one of the stators extends through a rotation axis for rotation of the base.

18. The elevator apparatus according to claim 12, wherein the stators penetrate through the base from the first side of the base to the second side of the base.

19. A conveying path switching device provided in a conveying apparatus that drives a conveying carriage, comprising:
a base;
stators along conveying paths for branching for the conveying carriage;
a first conveying path on the base; and
a second conveying path that is on the base and is different from the first conveying path, wherein
as for a conveying path on which the conveying carriage travels, the first conveying path and the second conveying path are switchable by rotation thereof, and
the stators are shared for both the first conveying path and the second conveying path, and
the stators penetrate through the base from the first conveying path to the second conveying path.

20. An elevator apparatus that drives a car by thrust generated between a primary coil of a linear motor provided in a hoistway and a magnet that is provided in the car and configures a secondary side of the linear motor, comprising the conveying path switching device according to claim 19 for switching conveying paths.

* * * * *